(12) United States Patent
Watanabe

(10) Patent No.: US 7,057,652 B2
(45) Date of Patent: Jun. 6, 2006

(54) COLOR SOLID-STATE IMAGING APPARATUS

(75) Inventor: Takashi Watanabe, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 510 days.

(21) Appl. No.: 09/994,539

(22) Filed: Nov. 27, 2001

(65) Prior Publication Data

US 2002/0063787 A1    May 30, 2002

(30) Foreign Application Priority Data

Nov. 28, 2000  (JP) .............................. 2000-361978

(51) Int. Cl.
*H04N 3/14*   (2006.01)
*H04N 5/335*  (2006.01)
*H04N 9/83*   (2006.01)
*H04N 9/04*   (2006.01)

(52) U.S. Cl. ...................................... 348/272; 348/273

(58) Field of Classification Search ......... 348/272–283
See application file for complete search history.

(56) References Cited

U.S. PATENT DOCUMENTS 5,323,233 A * 6/1994 Yamagami et al. ......... 348/277
5,493,335 A * 2/1996 Parulski et al. .......... 348/231.6
5,880,781 A * 3/1999 Udagawa et al. ........... 348/279
6,657,755 B1 * 12/2003 Campbell .................... 358/514
6,809,764 B1 * 10/2004 Misawa et al. ............. 348/272

FOREIGN PATENT DOCUMENTS

JP    09-312849    2/1997

* cited by examiner

*Primary Examiner*—David Ometz
*Assistant Examiner*—Yogesh Aggarwal
(74) *Attorney, Agent, or Firm*—David G. Conlin; William J. Daley, Jr.; Edwards, Angell, Palmer & Dodge LLP

(57) ABSTRACT

A color solid-state imaging apparatus of the present invention includes a read pixel position selecting section for selecting read pixel positions such that in two directions crossing each other, a first pixel pair of horizontally-adjacent pixels corresponding to a first color filter segment and one of a second color filter segment and a third color filter segment and a second pixel pair of vertically-adjacent pixels corresponding to a first color filter segment and the one or the other one of a second color filter segment and a third color filter segment are provided so as to alternate with each other, and there are (N−1) pairs of unselected pixels (N is a positive integer) between the alternate first and second pixel pairs.

2 Claims, 18 Drawing Sheets

FIG.15
PRIOR ART

◯ denotes a pixel to be read

| | G | R | G | R | G | R | G | R |
|---|---|---|---|---|---|---|---|---|
| Read | Ⓖ | Ⓡ | Ⓖ | Ⓡ | Ⓖ | Ⓡ | Ⓖ | Ⓡ |
| | Ⓑ | Ⓖ | Ⓑ | Ⓖ | Ⓑ | Ⓖ | Ⓑ | Ⓖ |
| Skip | G | R | G | R | G | R | G | R |
| | B | G | B | G | B | G | B | G |
| Read | Ⓖ | Ⓡ | Ⓖ | Ⓡ | Ⓖ | Ⓡ | Ⓖ | Ⓡ |
| | Ⓑ | Ⓖ | Ⓑ | Ⓖ | Ⓑ | Ⓖ | Ⓑ | Ⓖ |
| Skip | G | R | G | R | G | R | G | R |
| | B | G | B | G | B | G | B | G |

COLOR SOLID-STATE IMAGING APPARATUS

BACKGROUND OF THE INVENTION

1. Field of the Invention

The present invention relates to a color solid-state imaging apparatus for use in an image information apparatus, such as a digital still camera, a digital video camera, a PC (personal computer) camera, and a mobile phone camera (i.e., a mobile phone including a built-in camera), which decimatingly reads image data obtained by its imaging section. The present invention also relates to an image information apparatus using such a color solid-state imaging apparatus.

2. Description of the Related Art

Conventionally, a color solid-state imaging apparatus using an entire-pixel data reading (progressive scanning) method reads entire pixel data in one reading operation and employs a Bayer array color filter as illustrated in FIG. 12 in which a green (G) filter segment is provided on every other pixel in horizontal and vertical directions so as to form a checkered pattern, and red (R) and blue (B) filter segments are provided in pixel positions on alternate rows where the green filter segment is not provided.

FIG. 13 illustrates spatial resolutions of G, R and B signals in the case where information is read from all of the pixels in the Bayer array of FIG. 12. In FIG. 13, the number "1", indicated in both horizontal (X) and vertical (Y) directions, represents a Nyquist threshold frequency of a signal obtained from a monochrome image obtained without using a color filter. The green (G) signal, which contributes to a luminance signal the most, has high resolutions in both horizontal (X) and vertical (Y) directions. The other two color signal components, the red (R) and blue (B) signals, have equal resolution in both horizontal (X) and vertical (Y) directions, so that a well-balanced color signal resolution can be obtained. Thus, the most efficient spatial resolution can be obtained for both the luminance and color signals.

When a color filter having the Bayer array structure shown in FIG. 12 is used, a suitable timing of a read signal is as shown in FIG. 14. FIG. 14 illustrates two types of lines in which one line type alternately includes G and R signals for each pixel period (=T), and the other line type alternately includes G and B signals for each pixel period (=T). These lines alternate with each other for each horizontal scanning period (=H). In the example illustrated in FIG. 12 where the number of pixels included in a row is m, and the number of pixels included in a column is n, a signal corresponding to m pixels can be obtained in each horizontal scanning period (1H).

Japanese Laid-Open Publication No. 9-312849, "Solid-State Imaging Apparatus", proposes a data reading method by which pixel data obtained from the above-described Bayer array color filter is read in a ½ decimated manner. In this method, as illustrated in FIG. 15, data corresponding to pixels in two adjacent rows is read, and then data corresponding to pixels in the next two rows is skipped. This procedure is sequentially repeated. It should be noted that the phrase "to read pixel data in a ½ decimated manner" described herein means that data corresponding to a half of the pixels (R, G, and B) included in a pixel array is read.

However, in the conventional data reading method described above, the resolution for one field of pixels is extremely deteriorated. FIGS. 16A, 16B and 16C illustrate sampling points of R, G and B signals, respectively. As illustrated in FIG. 17, the spatial resolutions of the R, G and B signals obtained from the sampling points of FIGS. 16A, 16B and 16C are high in the horizontal direction (X direction), but extremely low in the vertical direction (Y direction), resulting in a poorly-balanced resolution characteristic. As a result, the obtained image appears unnatural since the resolution thereof extremely deteriorates in the vertical direction. In the Bayer array of FIG. 15, if pixel data is read using an interlaced scanning method, the vertical resolution can be slightly improved. However, such a method cannot be used for obtaining a still image from one field of pixels, e.g., when one frame is recorded as a still image during dynamic image recording, the interlaced scanning method cannot be used to read pixel data.

SUMMARY OF THE INVENTION

According to one aspect of the present invention, a color solid-state imaging apparatus of the present invention includes: a plurality of pixel devices provided in a plane; a Bayer array color filter which includes first through third color filter segments and which is provided over the plurality of pixel devices, each of the first through third color filter segments corresponding to a respective one of the plurality of pixel devices; and a read pixel position selecting section for selecting read pixel positions such that in two directions crossing each other, a first pixel pair of horizontally-adjacent pixels (a first pixel unit selecting two horizontally-adjacent pixels) corresponding to a first color filter segment and one of a second color filter segment and a third color filter segment and a second pixel pair of vertically-adjacent pixels (a second pixel unit selecting two vertically-adjacent pixels) corresponding to a first color filter segment and the one or the other one of a second color filter segment and a third color filter segment are provided so as to alternate with each other, and there are (N−1) pairs (units) of unselected pixels (N is a positive integer) between the alternate first and second pixel pairs (units). Thus, an objective of the present invention can be achieved.

According to another aspect of the present invention, a color solid-state imaging apparatus includes: a plurality of pixel devices arranged in a matrix; a color filter which includes first through third color filter segments and which is provided over the plurality of pixel devices, the first color filter segments having a first spectral characteristic, the second color filter segments having a second spectral characteristic, and the third color filter segments having a third spectral characteristic, in which the first color filter segments are provided over every other pixel device in horizontal and vertical directions, and the second and third color filter segments are line-sequentially provided over the remaining pixel devices, in which the first color filter segments are not provided, in separate rows in an alternating manner; and a read pixel position selecting section for selecting read pixel positions such that the plurality of pixel devices are divided into pixel units in such a manner that each pixel unit consists of four pixel devices of the plurality of pixel devices arranged so as to have two horizontally-adjacent pixel devices and two vertically-adjacent pixel devices, a first pixel unit selecting two horizontally-adjacent pixel devices respectively corresponding to a first color filter segment and a second color filter segment, and a second pixel unit selecting two vertically-adjacent pixel devices respectively corresponding to a first color filter segment and a third color filter segment. In this color solid-state imaging apparatus, in two directions crossing each other, the first pixel unit and the second pixel unit alternate with each other, and there are (N−1) units of unselected pixels (N is a positive integer)

between the alternate first and second units. Thus, an objective of the present invention can be achieved.

A pixel refers to a minimum unit of elements constituting an image. A pixel device refers to an imaging device, such as a CCD (a pixel signal generator), for producing a portion of an image which corresponds to a pixel. In the plurality of imaging devices arranged in a matrix form, a horizontal direction and a vertical direction refer to a row and a column, respectively. When the positive integer N is 1, all of the pixels arranged in a matrix form are selected, so that the read pixel positions are selected as illustrated in FIG. 2. The first pixel pair may be horizontally-adjacent pixels corresponding to a first color filter segment and a second or third color filter segment. The second pixel pair may be vertically-adjacent pixels corresponding to a first color filter segment and a third or second color filter segment. In FIG. 2, thick lines are used to show that the plurality of pixel devices are divided into pixel units in such a manner that each pixel unit consists of four pixel devices of the plurality of pixel devices arranged so as to have two horizontally-adjacent pixel devices and two vertically-adjacent pixel devices, and lines X and Y indicate the horizontal and vertical directions, i.e., two directions crossing each other.

With the structure described above, even when pixel signals corresponding to first through third color filter segments included in a Bayer array color filter are obtained by decimating pixel data, in comparison with conventional methods for reading pixel data obtained through the Bayer array color filter, a pixel signal corresponding to the first color filter segment obtained from an image in one field can have relatively high resolution which is well-balanced in both horizontal and vertical directions. Moreover, pixel signals corresponding to the second color and third color filter segments can have equal resolution in both vertical and horizontal directions, so that well-balanced color signal resolution can be obtained. Thus, the most efficient resolution can be obtained for luminance and color signals.

According to the present invention, in the case where the decimation rate is ½, in comparison with the case where data corresponding to all of the pixels in the Bayer array are read, when the frame rate is the same, a period of time required for reading data corresponding to one pixel can be doubled. Alternatively, when the period of time required for reading the data corresponding to one pixel is the same, the frame rate can be doubled. Similarly, in the case where there are (N−1) pairs (units) of unselected pixels (N is a positive integer) in a pixel array, in comparison with the case where the data corresponding to all of the pixels in the Bayer array are read, when the frame rate according to the present invention is the same, a period of time required for reading data corresponding to one pixel can be lengthened depending on a decimation rate. Alternatively, when the period of time required for reading the data corresponding to one pixel according to the present invention is the same, the frame rate can be increased depending on the decimation rate.

In the color solid-state imaging apparatus according to the present invention, the two directions crossing each other may be horizontal and vertical directions. Alternatively, the two directions crossing each other may be two different diagonal directions. The first color filter segment may be a green filter segment, the second color filter segment may be a red filter segment, and the third filter segment may be a blue filter segment.

With the structure described above, in the case where pixel data is read in a ½-decimation manner, when the two directions crossing each other are horizontal and vertical directions, two of the G pixels, which contribute to a luminance signal the most, are selected from alternate rows and columns in both horizontal and vertical directions, so that relatively high resolution, which is well-balanced in the horizontal and vertical directions, can be efficiently obtained. The R and B pixels are selected from alternate rows and columns along the diagonal directions, so that resolution, which is equal in both the horizontal and vertical directions, can be obtained. Thus, color signal resolution, which is well-balanced in both the horizontal and vertical directions, can be efficiently obtained. In other words, both the luminance and color signals can be obtained in the most efficient manner.

Similar to the case where pixel data is read in a ½-decimation manner when the two directions crossing each other are horizontal and vertical directions, for example, in the case where: pixel data is read in a ¼-decimation manner when the two directions crossing each other are two different diagonal directions (N=1); pixel data is read in a ⅛-decimation manner when the two directions crossing each other are horizontal and vertical directions (N=2); or pixel data is read in a ⅟₁₈-decimation manner when the two directions crossing each other are two different diagonal directions (N=3), color signal resolution, which is well-balanced in both horizontal and vertical directions, can be efficiently obtained.

In the color solid-state imaging apparatus according to the present invention, in comparison with a case where data corresponding to all of the pixels is read, a frame rate may be the same, and a pixel reading period may be increased $2N^2$ times.

In the color solid-state imaging apparatus according to the present invention, in comparison with a case where data corresponding to all of the pixels is read, the period of time required for reading one pixel may be the same, and the frame rate may be increased $2N^2$ times.

In the color solid-state imaging apparatus according to the present invention, in comparison with a case where data corresponding to all of the pixels is read, a frame rate may be the same, and a pixel reading period may be increased $4N^2$ times.

In the color solid-state imaging apparatus according to the present invention, in comparison with a case where data corresponding to all of the pixels is read, the period of time required for reading one pixel may be the same, and the frame rate may be increased $4N^2$ times.

In the color solid-state imaging apparatus according to the present invention, a series of horizontal reading operations may be performed so as to read data corresponding to selected pixels row-by-row, and color signal processing may be performed on the data corresponding to selected pixels which is read in two horizontal reading operations.

In the color solid-state imaging apparatus according to the present invention, a series of horizontal reading operations may be performed such that data corresponding to upper and lower pixels alternately selected in two adjacent rows is read in each of the series of horizontal reading operations, and color signal processing may be performed on the data corresponding to the alternately-selected pixels which is read in two horizontal reading operations.

In the color solid-state imaging apparatus According to the present invention, a series of horizontal reading operations may be performed so as to read data corresponding to selected pixels row-by-row, and color signal processing may be performed on the data corresponding to selected pixels which is read in three horizontal reading operations.

In the color solid-state imaging apparatus according to the present invention, a series of horizontal reading operations may be performed such that data corresponding to upper and lower pixels alternately selected in two adjacent rows is read in each of the series of horizontal reading operations, and color signal processing may be performed on the data corresponding to the alternately-selected pixels which is read in four horizontal reading operations.

According to still another aspect of the present invention, there is provided an image information apparatus for imaging an object using the color solid-state imaging device according to the present invention.

Thus, the invention described herein makes possible the advantages of providing: a color solid-state imaging apparatus which can efficiently obtain well-balanced horizontal and vertical resolution of an image obtained from one field even when pixel data obtained from a Bayer array color filter is decimatingly read; and an image information apparatus using such a color solid-state imaging apparatus.

These and other advantages of the present invention will become apparent to those skilled in the art upon reading and understanding the following detailed description with reference to the accompanying figures.

BRIEF DESCRIPTION OF THE DRAWINGS

FIG. 15 is a diagram illustrating conventional read pixel positions in the case where data corresponding to pixels in the Bayer array of FIG. 12 is read in a ½-decimated manner.

DESCRIPTION OF THE PREFERRED EMBODIMENTS

Hereinafter, a color solid-sate imaging apparatus according to Examples 1 and 2 of the present invention will be described with reference to the attached drawings.

EXAMPLE 1

Figure 1:
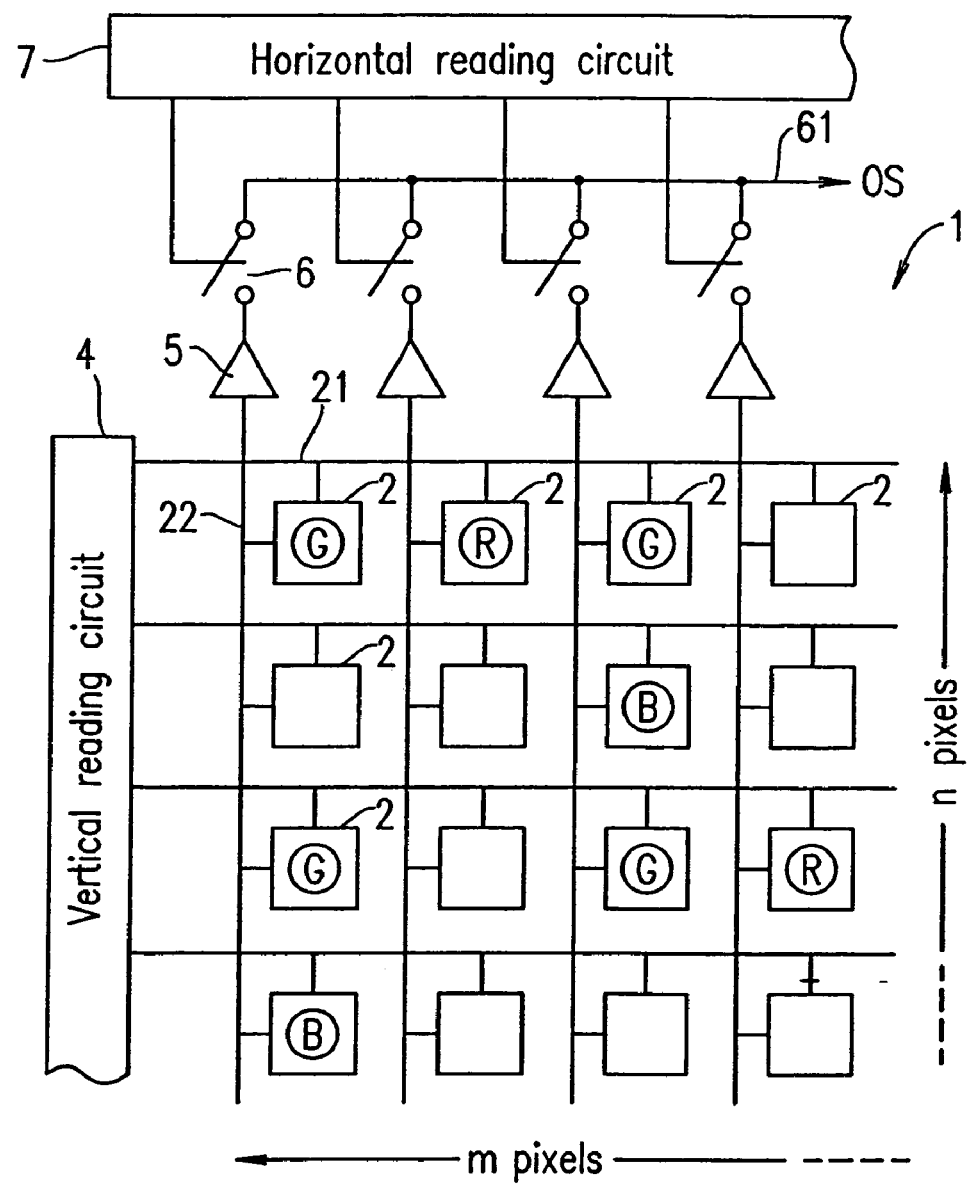
FIG. 1 is a schematic block diagram showing a structure of a primary portion of a two-dimensional color solid-state imaging apparatus according to Example 1 of the present invention.
Figure 2:
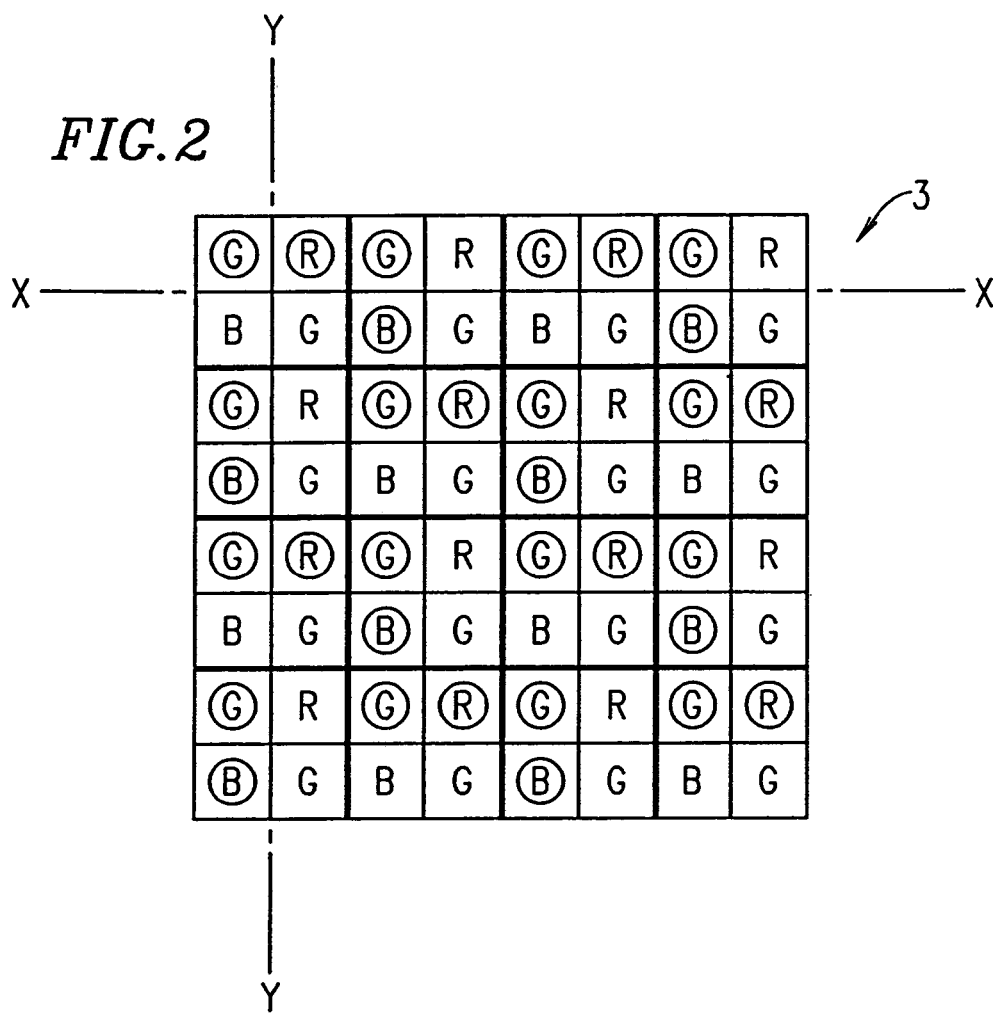
FIG. 2 is a diagram illustrating read pixel positions in a two-dimensional color filter array of the color solid-state imaging apparatus of FIG. 1.

FIG. 1 is a schematic block diagram showing a structure of a primary portion of a two-dimensional color solid-state imaging apparatus 1 according to Example 1 of the present invention. FIG. 2 is a diagram illustrating read pixel positions in a two-dimensional color filter array of the two-dimensional color solid-state imaging apparatus 1 of FIG. 1.

Referring to FIGS. 1 and 2, the two-dimensional color solid-state imaging apparatus 1 includes: a plurality of imaging devices 2 (pixel devices) provided in a plane; a color filter 3 (illustrated in FIG. 2) provided over the plurality of imaging devices 2; a vertical reading circuit 4 for sequentially outputting a drive signal to each of the imaging devices 2 for each row along the vertical direction; amplifier circuits 5 each for amplifying a pixel signal read from a corresponding imaging device 2 by the vertical reading circuit 4; switching circuits 6 each for transmitting a signal amplified by a corresponding amplifier circuit 5; and a horizontal reading circuit 7 for controlling the switching circuit 6. The vertical reading circuit 4 and the horizontal reading circuit 7 function together as a read pixel position selecting section which reads pixel data in a decimated manner by sequentially selecting desired imaging devices 2 according to a data reading method of the present invention.

The plurality of imaging devices 2 are arranged in rows and columns, thereby forming a matrix. Each imaging device 2 serves as a pixel signal generator, e.g., a CMOS imager, a CCD image sencer, etc., and performs photoelectric conversion of image light received from an external object image according to a level of the image light. The imaging devices 2 are arranged in a matrix including m pixels in each row and n pixels in each column. There are n horizontal drive lines 21, which are parallel to one another. Each horizontal drive line 21 is connected tom imaging devices 2 aligned in the horizontal direction. There are m vertical signal lines 22, which are parallel to one another. Each vertical signal line 22 is connected to n imaging devices 2 aligned in the vertical direction. The "horizontal and vertical directions" described herein may be any two directions crossing each other at right angles, e.g., the two directions may be switched with one another.

Figures 12, 13:
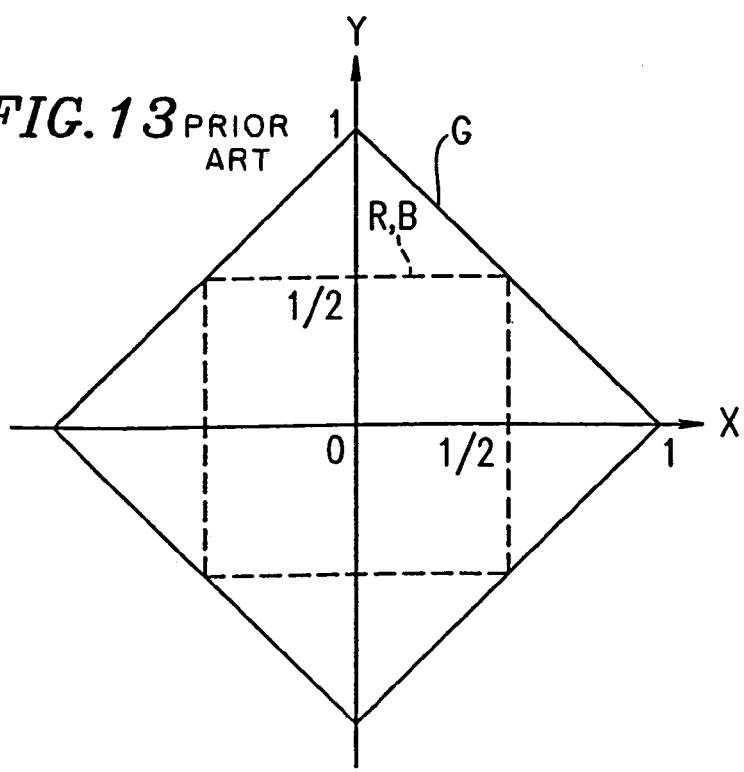
FIG. 12 is a diagram illustrating a Bayer array color filter provided in a color solid-state imaging apparatus.
FIG. 13 is a diagram illustrating respective spatial resolutions of color signals obtained in the case where information on all of the pixels in the Bayer array of FIG. 12 are read.

The Bayer array color filter 3 is as shown in FIG. 12 and is provided over the plurality of the imaging devices 2 (pixel devices) arranged in a matrix form, so as to cover faces of the imaging devices 2 on which image light is received.

The vertical reading circuit 4 outputs a drive signal so as to sequentially select each of the horizontal drive lines 21 along the vertical direction.

Each amplifier circuit 5 is provided on the output side of a corresponding one of the m vertical signal lines 22 along the vertical direction and amplifies a pixel signal, which is output via the vertical signal line 22 from the imaging device 2, by a desired amplification factor.

Each switching circuit 6 is provided on the output side of a corresponding amplifier circuit 5 and cuts off (stops) a signal amplified by the corresponding amplifier circuit 5 or outputs the signal via a horizontal output line 61 in accordance with a switching control signal output from the horizontal reading circuit 7.

The horizontal reading circuit 7 performs On/Off control of each of the switching circuits 6 so as to selectively control a signal from each of the imaging devices 2 in a row selected by the vertical reading circuit 4. In Example 1, the vertical reading circuit 4 and the horizontal reading circuit 7 are used to read pixel data in a ½-decimated manner so as to read data corresponding to pixels provided in read pixel positions indicated by circles in FIGS. 1 and 2 which are described in detail below.

A pixel signal reading operation of the above-described color solid-state imaging apparatus 1 is described below. Referring to FIG. 1, the vertical reading circuit 4 sequentially applies a drive signal via each of the drive lines 21 to the imaging devices 2 in a corresponding row. For example, the vertical reading circuit 4 selects the imaging devices 2 in a first row by applying a drive signal thereto via a first drive line 21, and the imaging devices 2 in the first row output pixel signals via the respective vertical signal lines 22.

Next, the amplifier circuits 5 receive the pixel signals via the respective vertical signal lines 22 and amplify the pixel signals. Then, the amplified pixel signals are selectively supplied to the horizontal output line 61 by performing On/Off control of the switching circuits 6 in timing with the switching control signals applied to the switching circuits 6 by the horizontal reading circuit 7, so that the pixel signals are output as output signals OS illustrated in FIG. 5 via the horizontal output line 61.

The data reading method according to Example 1 is now described in more detail with reference to the two-dimensional color filter array of FIG. 2. In FIG. 2, the read pixel positions according to Example 1 are indicated by circles.

In the read pixel positions according to Example 1 shown in FIG. 2, when pixel data is read in a ½-decimated manner, a plurality of sets of four sequential pixels, each of which includes a first pixel pair of horizontally-adjacent G and R pixels and a second pixel pair of vertically-adjacent G and B pixels, and in which the first pixel pairs and the second pixel pairs alternate, are selected from all of the plurality of pixels in the array. FIG. 2 illustrates the read pixel positions of only a part of the pixel array according to Example 1.

The read pixel positions are selected such that the plurality of pixel devices are divided into pixel units in such a manner that each pixel unit consists of four pixel devices of the plurality of pixel devices arranged so as to have two horizontally-adjacent pixel devices and two vertically-adjacent pixel devices, a first pixel unit selecting two horizontally-adjacent pixel devices respectively corresponding to a first color filter segment and a second color filter segment, and a second pixel unit selecting two vertically-adjacent pixel devices respectively corresponding to a first color filter segment and a third color filter segment. In FIG. 2, thick lines are used to show that the plurality of pixel devices are divided into pixel units in such a manner that each pixel unit consists of four pixel devices of the plurality of pixel devices arranged so as to have two horizontally-adjacent pixel devices and two vertically-adjacent pixel devices, and lines X and Y indicate the horizontal and vertical directions, i.e., two directions crossing each other.

Figure 3A:
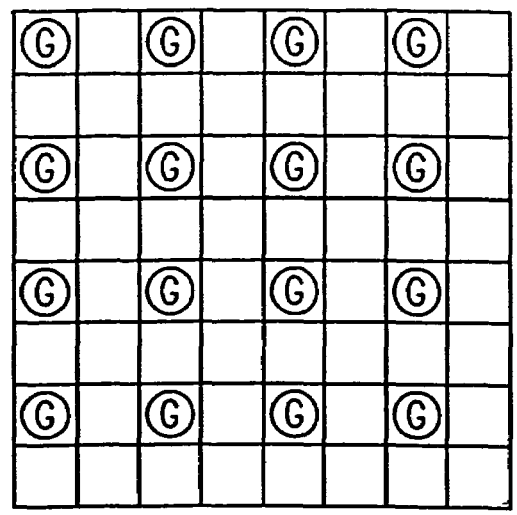
FIG. 3A is a diagram illustrating sampling positions of green (G) pixels (filter segments) of FIG. 2.
Figure 3B:
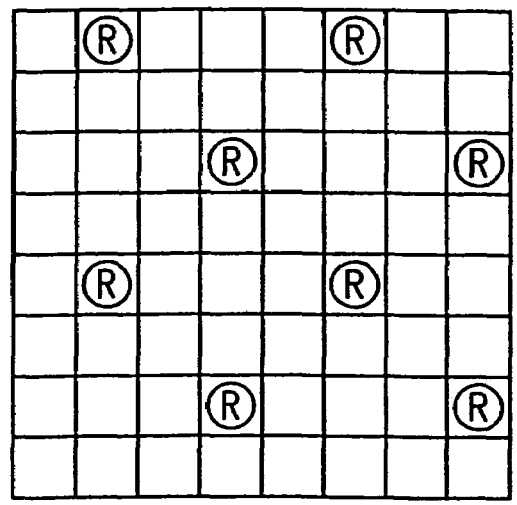
FIG. 3B is a diagram illustrating sampling positions of red (R) pixels (filter segments) of FIG. 2.
Figure 3C:
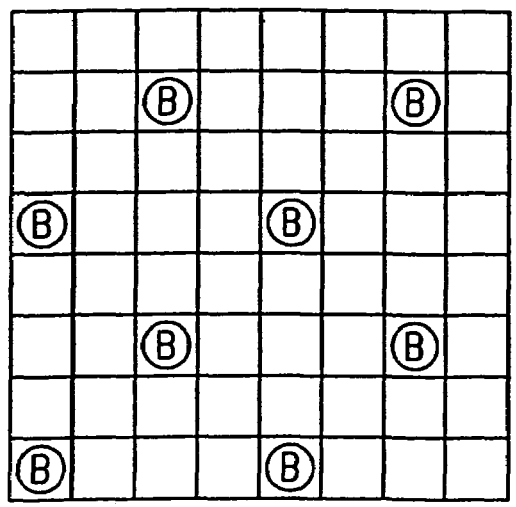
FIG. 3C is a diagram illustrating sampling positions of blue (B) pixels (filter segments), of FIG. 2.
Figure 4:
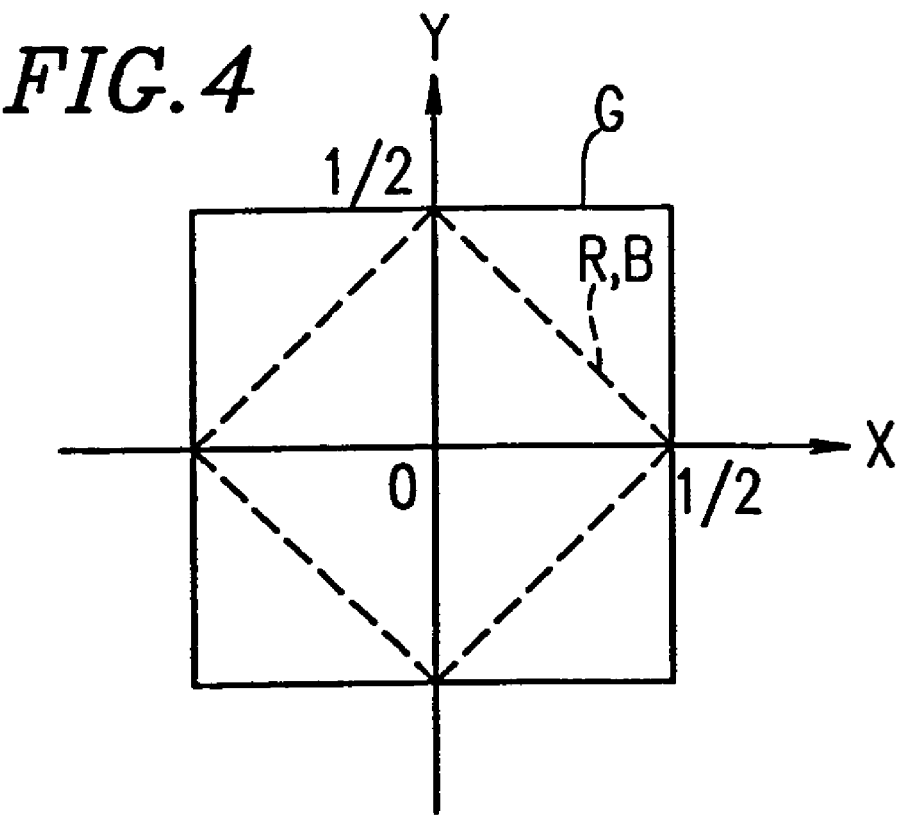
FIG. 4 is a diagram illustrating respective spatial resolutions of color signals obtained using the color solid-state imaging apparatus of FIG. 1.

FIGS. 3A, 3B, and 3C illustrate positions of G, R and B pixels (filter segments), respectively, which are selected in the read pixel positions of FIG. 2. As can be seen from FIGS. 3A, 3B, and 3C, the G pixels are selected from alternate rows and columns in both horizontal and vertical directions, and the R and B pixels are selected from alternate rows and columns along the diagonal directions. FIG. 4 illustrates spatial resolutions of G, R and B signals obtained from the G, R and B pixels arranged in the above-described read pixel positions. Although not shown in FIG. 4, the number "1" as shown in FIG. 13 represents, in both horizontal (X) and vertical (Y) directions, the Nyquist threshold frequency of a signal obtained from a monochrome image obtained without using a color filter. Where a pixel spatial period of the monochrome image signal is T, a pixel spatial frequency fc of the monochrome image signal is represented by fc=1/T, and thus a Nyquist frequency $f_N$ of the monochrome image signal is represented by $f_N$=fc/2, which is normalized to "1".

As illustrated in FIG. 4, the G signal, which contributes to a luminance signal the most out of the G, R and B signals, has a high resolution of up to a half of the Nyquist threshold value in both horizontal and vertical directions. The G signal also has a high resolution of up to $\sqrt{2}/2$ in the diagonal directions. The other two color signal components, the R and B signals, have equal resolution of up to a half of the Nyquist threshold value in both the horizontal and vertical directions. The R and B signals also have equal resolution of up to $\sqrt{2}/4$ in the diagonal directions, so that well-balanced color signal resolution can be obtained.

Figure 16A:
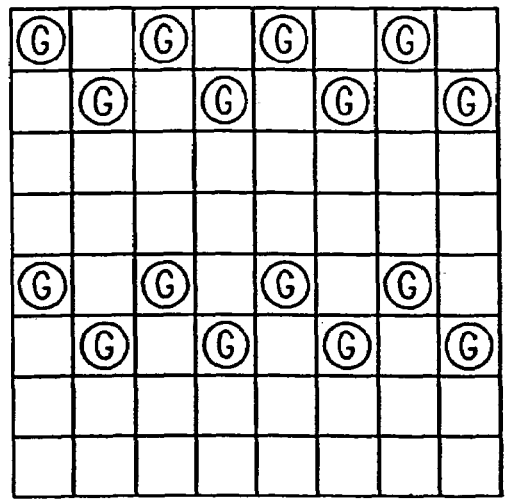
FIG. 16A is a diagram illustrating sampled pixel positions of G pixels (filter segments) of FIG. 15.
Figure 16B:
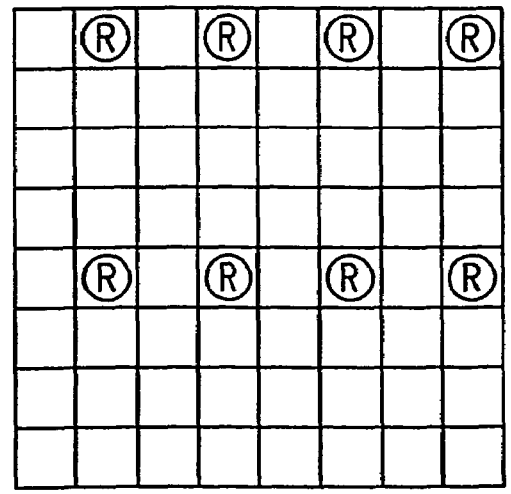
FIG. 16B is a diagram illustrating sampled pixel positions of R pixels (filter segments) of FIG. 15.
Figure 16C:
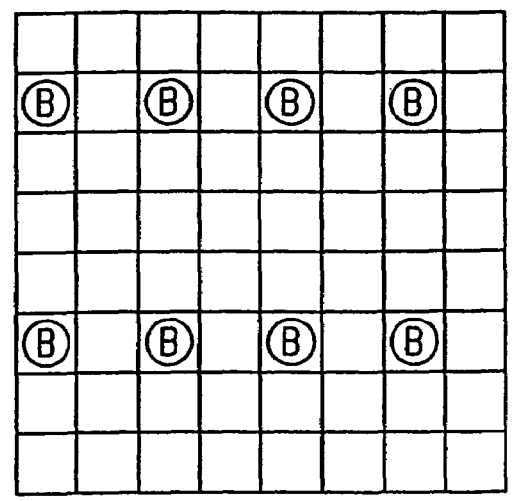
FIG. 16C is a diagram illustrating sampled pixel positions of B pixels (filter segments) of FIG. 15.
Figures 17, 18:
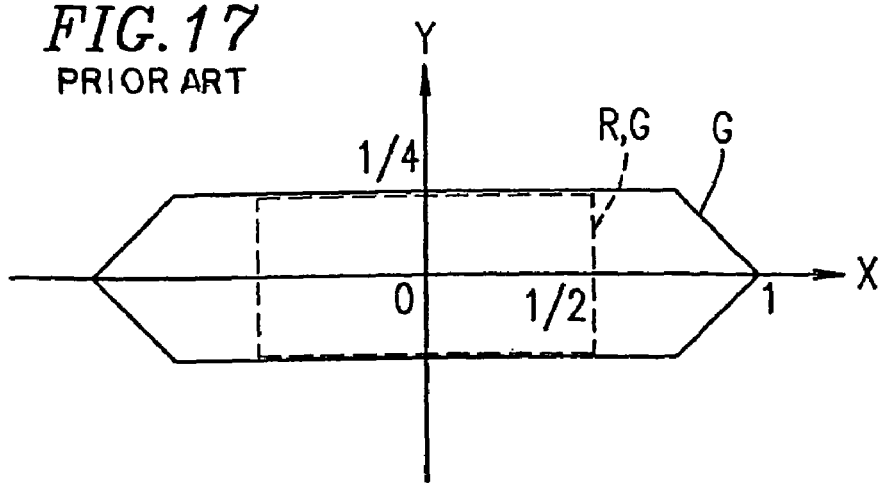
FIG. 17 is a diagram illustrating respective spatial resolutions of color signals obtained in the case where information on a half of the pixels in the Bayer array of FIG. 15 are read.
FIG. 18 is a diagram illustrating read pixel positions according to the present invention in the case where pixel data is read in a ⅔-decimated manner.

Comparing the spatial resolutions of the G, R and B signals according to Example 1 of FIG. 4 obtained in the read pixel positions illustrated in FIGS. 3A, 3B and 3C with the conventional spatial resolutions of the G, R and B signals of FIG. 17 obtained in read pixel positions illustrated in FIGS. 16A, 16B and 16C, it is appreciated that the resolutions of the G, R and B signals according to Example 1 are increased with respect to the vertical direction to twice the conventional resolutions, so that resolution which is well-balanced in both horizontal and vertical directions can be obtained for the luminance and color signals. Thus, the most efficient spatial resolution in a condition where pixel data is read in a ½-decimated manner can be obtained for the luminance and color signals.

Figure 5:
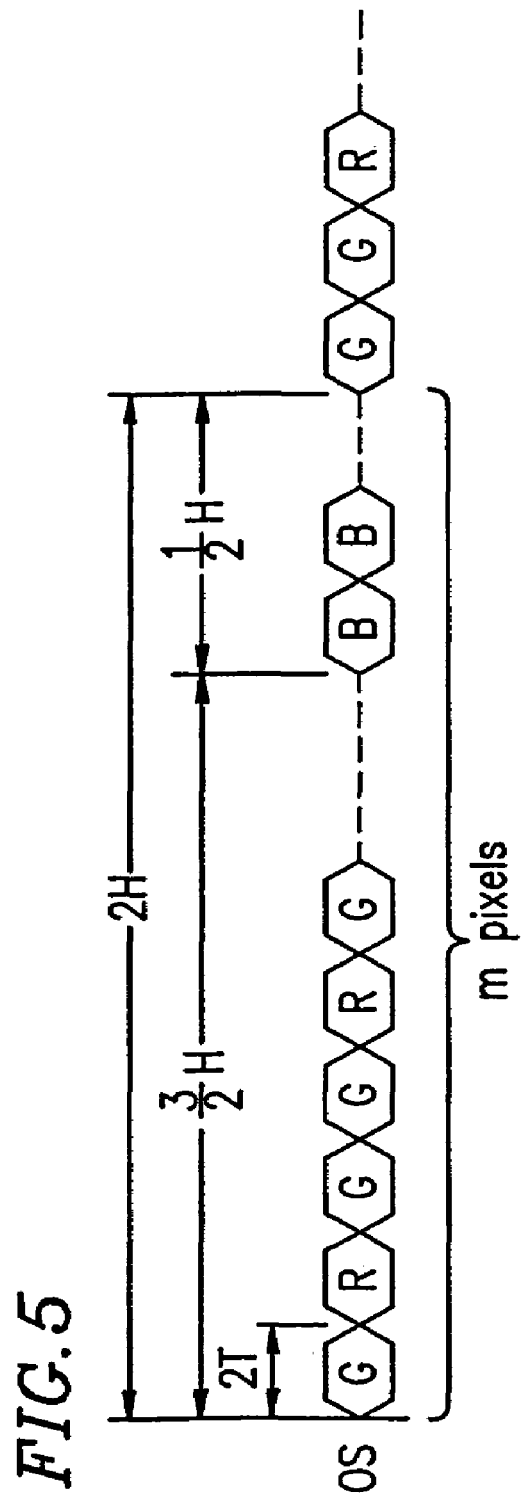
FIG. 5 is a diagram illustrating a timing of pixel signals obtained using the color solid-state imaging apparatus of FIG. 1.

Referring to FIG. 1, the vertical reading circuit 4 sequentially generates a drive signal for each row while the horizontal reading circuit 7 only generates drive signals for the switching circuits 6 corresponding to the selected pixels. FIG. 5 illustrates the timing of an output signal OS obtained by selectively applying the drive signal generated by the horizontal reading circuit 7 to the switching circuits 6. As illustrated in FIG. 5, each of the G and R signals corresponds to one pixel period, i.e., 2T, and G and R pixel periods are repeated for a period of 3H/2. The B signal corresponds to one pixel period (2T), and a B pixel period is repeated for a period of H/2. The G and R pixel periods (G and R signal periods) repeated for the period of 3H/2 and the B pixel periods (B signal periods) repeated for the period of H/2 alternate with each other, and thus, in a period of 2H, m pixel signals are obtained.

Figure 14:
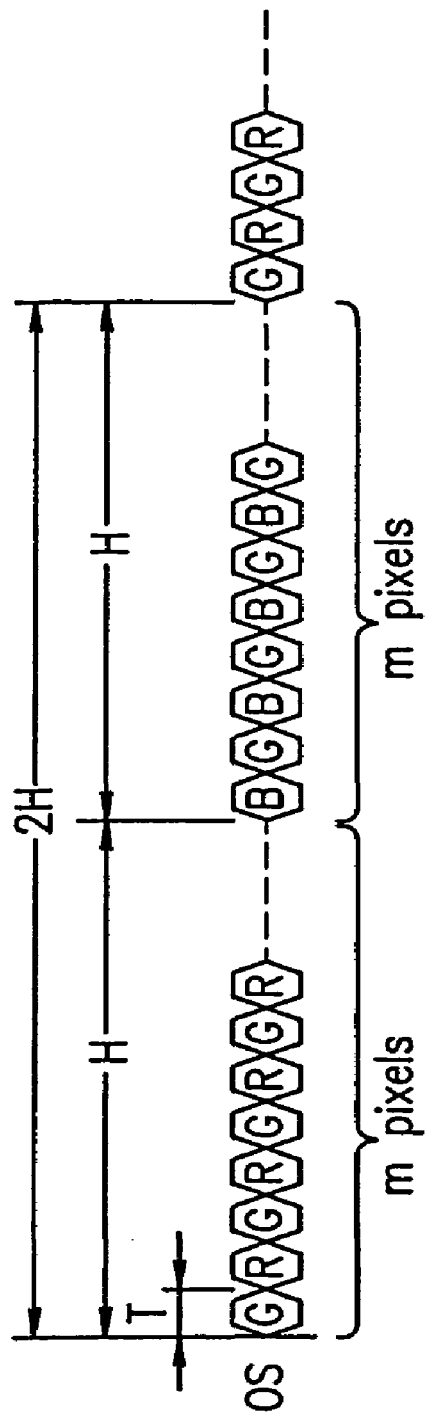
FIG. 14 is a diagram illustrating a timing of color signals obtained in the case where information on all of the pixels in the Bayer array of FIG. 12 are read.

As described above, color information for all of the G, R and B pixels can be obtained from the pixel signals produced within the period of 2H. Thus, by performing color signal processing for each period of 2H, color information obtained by Example 1 of the present invention can be more satisfactory than that obtained by conventional methods. Moreover, in comparison with the case described with reference to FIG. 14 where data corresponding to all of the pixels in the Bayer array are read, when a frame rate, i.e., a period of 1H, according to Example 1 is the same, a period of time required for reading data corresponding to one pixel is doubled. Alternatively, when the period of time required for reading the data corresponding to one pixel according to Example 1 is the same, the frame rate can be doubled. This is useful for increasing a frame rate when there is a limit to a signal processing speed.

EXAMPLE 2

Figure 6:
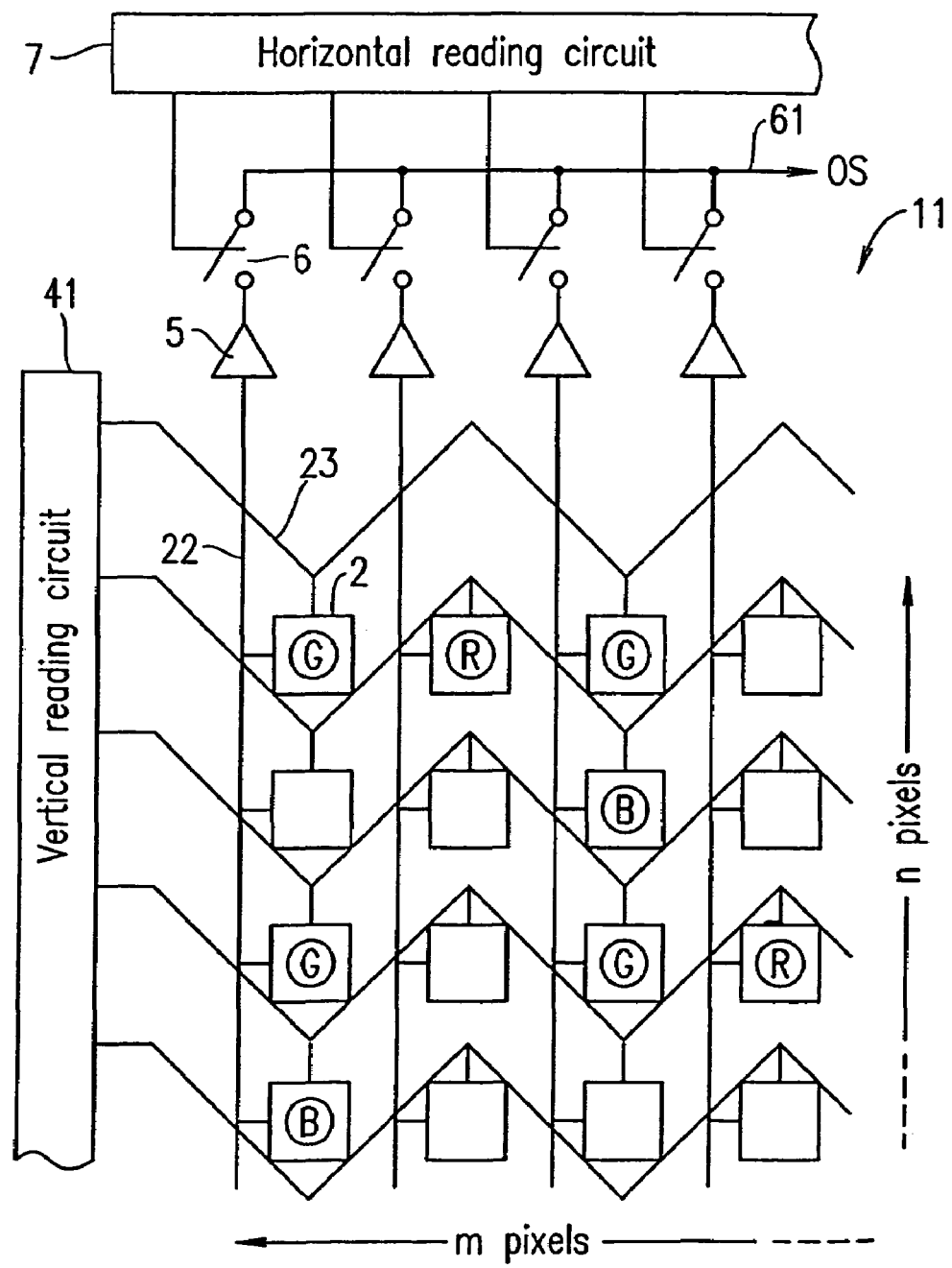
FIG. 6 is a schematic block diagram showing a structure of a primary portion of a color solid-state imaging apparatus according to Example 2 of the present invention.

FIG. 6 is a schematic block diagram showing a structure of a primary portion of a two-dimensional color solid-state imaging apparatus 11 according to Example 2 of the present invention. In FIG. 6, elements which produce similar effects to those described in Example 1 are denoted by like reference numerals used in FIG. 1, and thus descriptions thereof are omitted.

In FIG. 6, the two-dimensional color solid-state imaging apparatus 11 differs from the two-dimensional color solid-state imaging apparatus 1 of FIG. 1 in the respective combinations of the pixels connected to the drive lines. Specifically, in FIG. 6, a vertical reading circuit 41 is connected to a plurality of drive lines 23 laid out in a zigzag pattern. In this structure, the vertical reading circuit 41 outputs a drive signal so as to sequentially select the imaging devices 2 connected to each of the zigzag drive lines 23 along the vertical direction. As a result, a series of horizontal reading operations are performed such that data corresponding to upper and lower pixels alternately selected in two adjacent rows is read in each of the series of horizontal reading operations, and pixel signals are output via the vertical signal lines 22 from the selected imaging devices 2.

Figure 7:
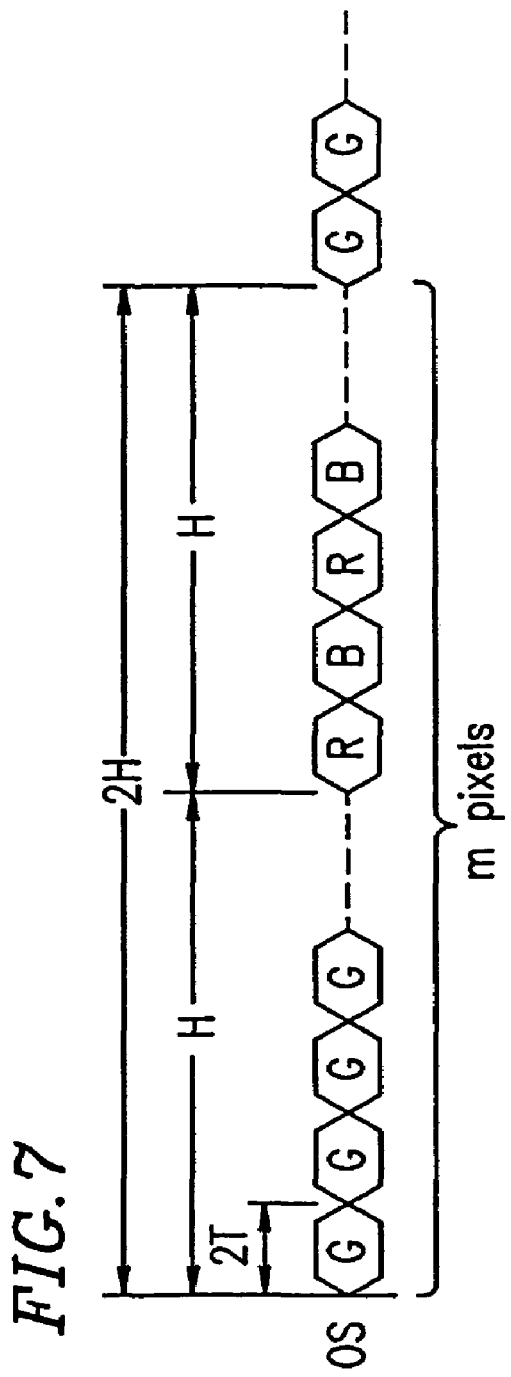
FIG. 7 is a diagram illustrating a timing of pixel signals obtained using the color solid-state imaging apparatus of FIG. 6.

The vertical reading circuit 41 sequentially applies a drive signal via the zigzag drive lines 23 to the imaging devices 2, so that pixel signals including only G pixel data and pixel signals including R and B pixel data can be obtained. FIG. 7 illustrates the timing of such pixel signals. Specifically, a G signal corresponds to one pixel period, i.e., 2T, and a G pixel period is repeated for a period of 1H. Each of the R and B signals corresponds to one pixel period, i.e., 2T, and R and B pixel periods alternate with each other, repeated for a period of 1H. The G pixel period of 1H and the R and B pixel period of 1H alternate with each other, and thus, in a period of 2H, m pixel signals are obtained. Similar to FIG. 1, the pixel array of FIG. 6 includes m pixels in each row and n pixels in each column.

In FIG. 7, color information for all of the G, R and B pixels can be obtained from the pixel signals obtained within the period of 2H. Thus, by performing color signal processing for each period of 2H, color information obtained by Example 2 of the present invention can be more satisfactory than that obtained by conventional methods. Moreover, in a similar manner as in the case described with reference to FIG. 5, in comparison with the case described with reference to FIG. 14 where data corresponding to all of the pixels in the Bayer array are read, when a frame rate, i.e., a period of 1H, according to Example 2 is the same, a period of time required for reading data corresponding to one pixel is doubled. Alternatively, when the period of time required for reading the data corresponding to one pixel according to Example 2 is the same, the frame rate can be doubled. This is useful for increasing a frame rate when there is a limit to the signal processing speed.

Figure 8:
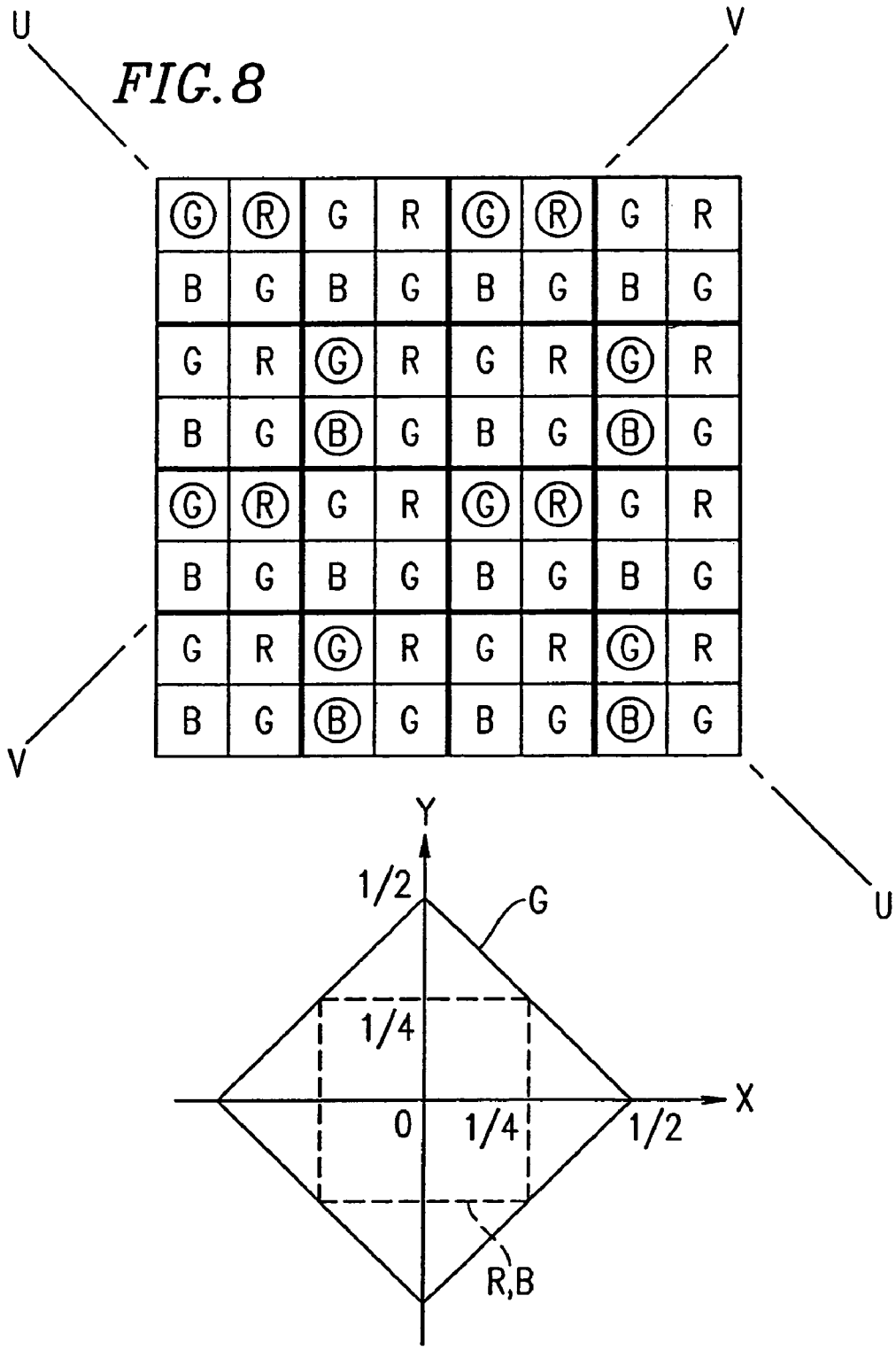
FIG. 8 is a diagram illustrating read pixel positions according to the present invention and spatial resolutions of color signals obtained from the pixels arranged in the read pixel positions in the case where pixel data is read in a ¼-decimatingly manner.
Figure 9:
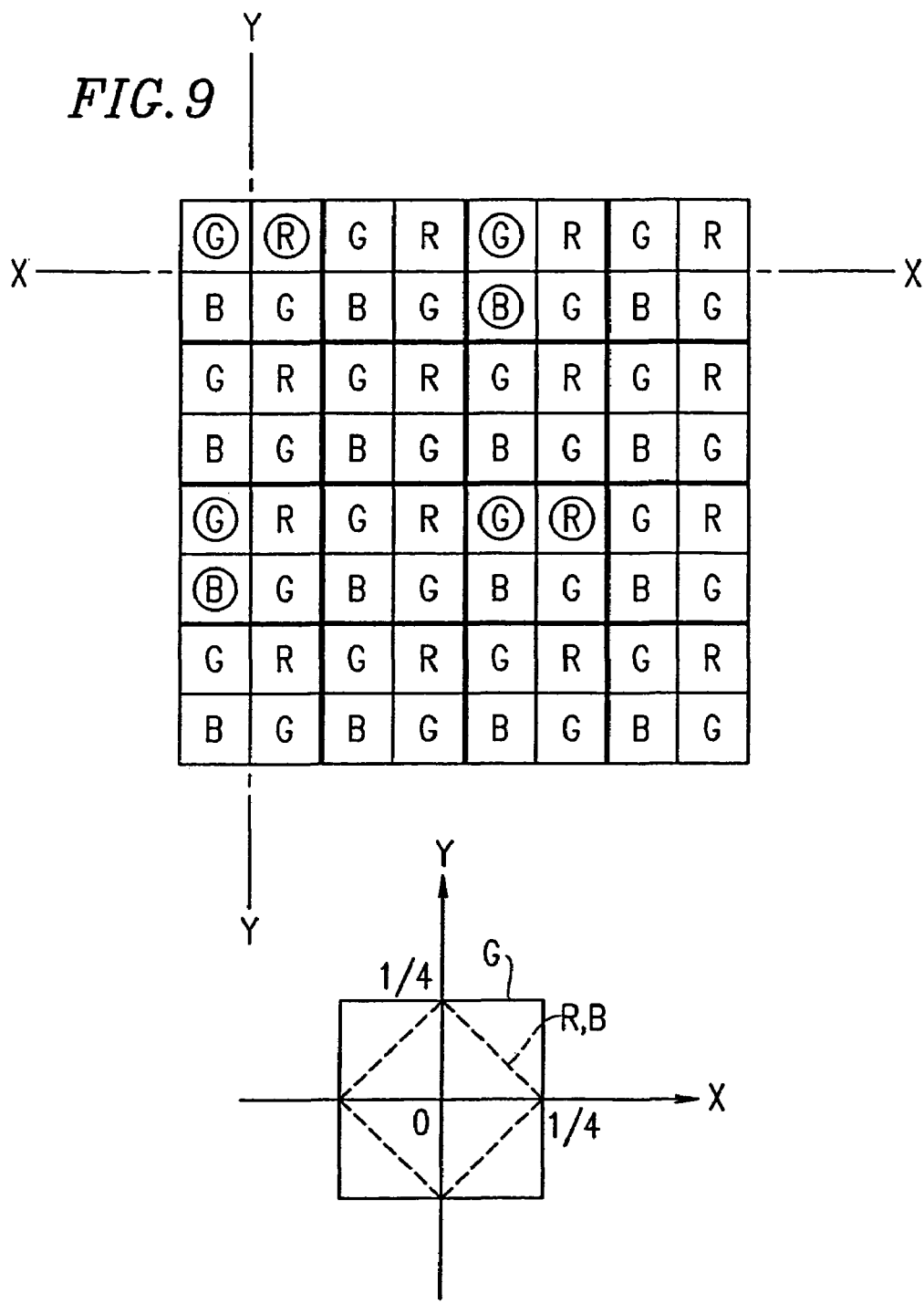
FIG. 9 is a diagram illustrating read pixel positions according to the present invention and spatial resolutions of color signals obtained from the pixels arranged in the read pixel positions in the case where pixel data is read in a ⅛-decimated manner.
Figure 10:
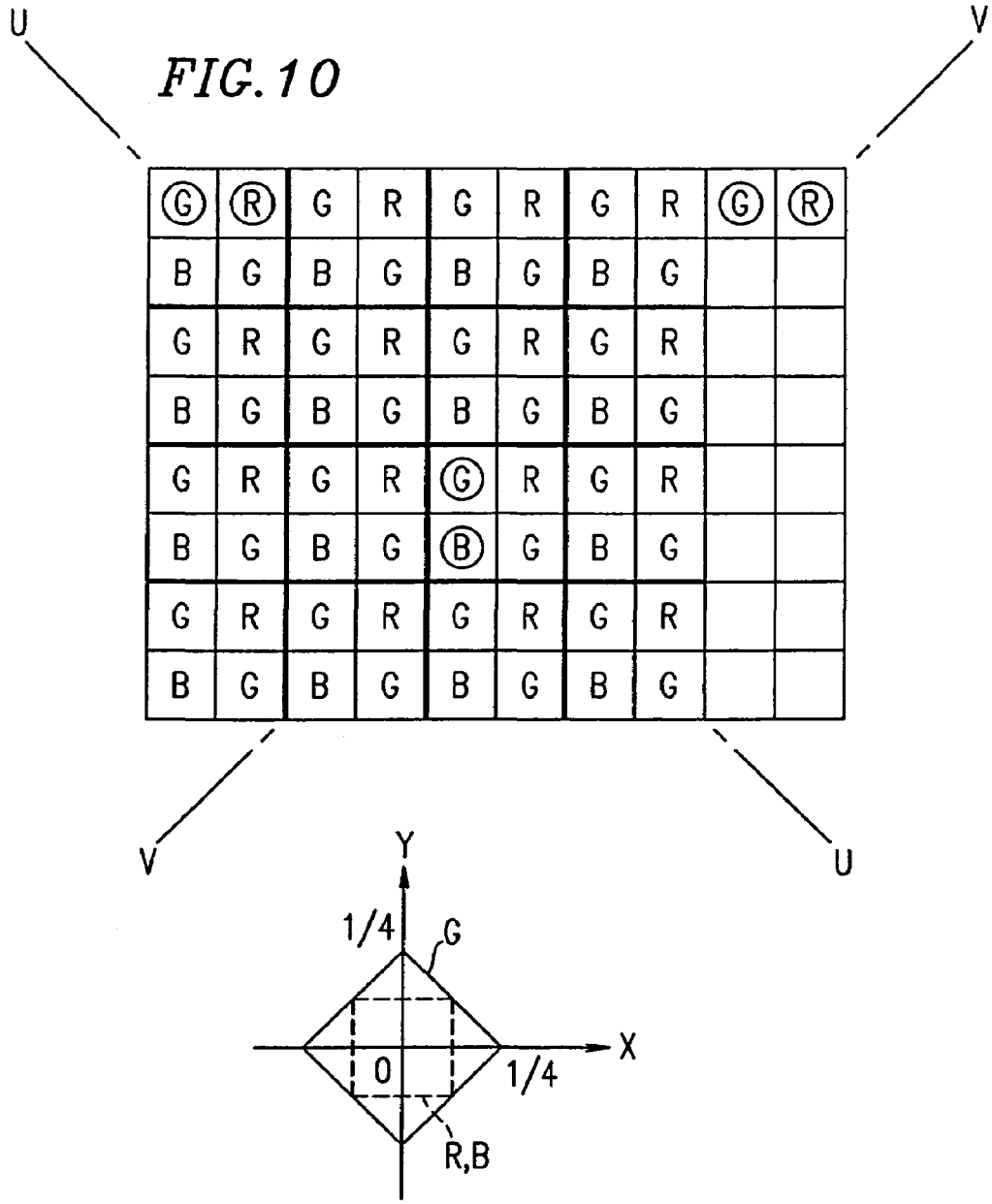
FIG. 10 is a diagram illustrating read pixel positions according to the present invention and spatial resolutions of color signals obtained from the pixels arranged in the read pixel positions in the case where pixel data is read in a 1/16-decimated manner.
Figure 11:
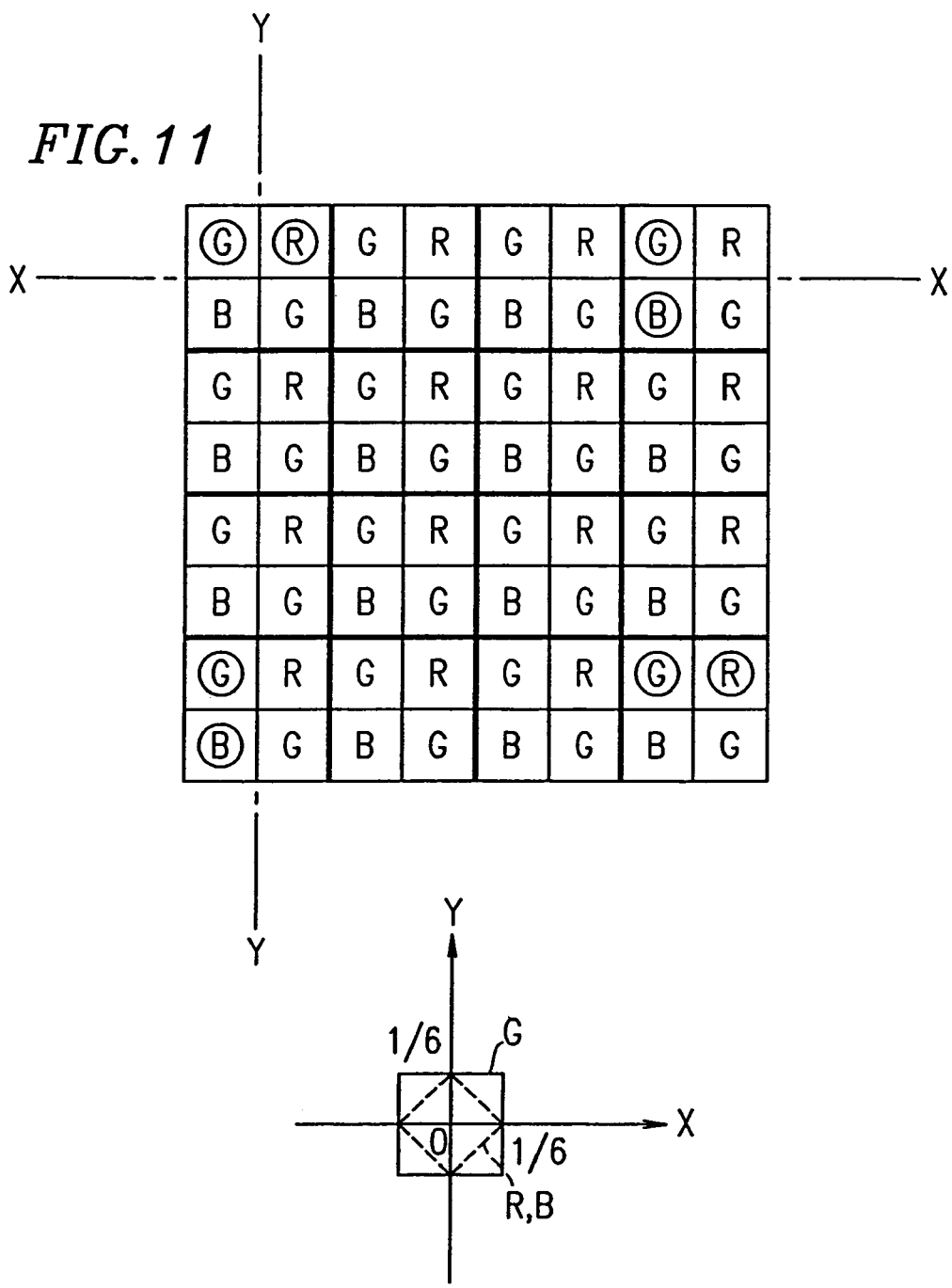
FIG. 11 is a diagram illustrating read pixel positions according to the present invention and spatial resolutions of color signals obtained from the pixels arranged in the read pixel positions in the case where pixel data is read in a 1/18-decimated manner.

Examples 1 and 2 have been described with regard to the case where the pixel data is read in a ½-decimated manner. However, the present invention is not limited to such a specific case. For example, pixel data may be read: in a ¼-decimated manner in accordance with read pixel positions shown in FIG. 8; in a ⅛-decimated manner in accordance with read pixel positions shown in FIG. 9; in a 1/16-decimated manner in accordance with read pixel positions shown FIG. 10; and in a 1/18-decimated manner in accordance with read pixel positions shown FIG. 11. At any of these decimation rates, color signals can have equal resolution in both the vertical and horizontal directions, so that well-balanced color signal resolution can be obtained. (It should be noted that the decimation rates described herein are based on an area ratio, and FIGS. 8–11 illustrate only a part of the respective pixel arrays. In FIGS. 8–11, thick lines are used to show that the plurality of pixel devices are divided into pixel units in such a manner that each pixel unit consists of four pixel devices of the plurality of pixel devices arranged so as to have two horizontally-adjacent pixel devices and two vertically-adjacent pixel devices. In FIGS. 9 and 11, lines X and Y indicate the horizontal and vertical directions, i.e., two directions crossing each other. In FIGS. 8 and 10, lines U and V indicate the diagonal directions, i.e., two directions crossing each other.) Particularly, in FIG. 11, data corresponding to two pixels is read from part of an entire pixel array which includes six rows, each row including a series of six pixels. That is, the pixel data to be read corresponds to 2/36, i.e., 1/18, of the pixel data obtained from the entire pixel array.

In Examples 1 and 2, read pixel positions are selected such that in two directions crossing each other, a first pixel pair of horizontally-adjacent pixels (a first pixel unit selecting two horizontally-adjacent pixels) corresponding to a first color filter segment (G) and a second color filter segment (R) and a second pixel pair of vertically-adjacent pixels (a second pixel unit selecting two horizontally-adjacent pixels) corresponding to the first color filter segment (G) and a third color filter segment (B) alternate with each other, and there are (N−1) pairs (units) of unselected pixels (N is a positive integer) between the alternate first and second pairs (units).

Figure 19:
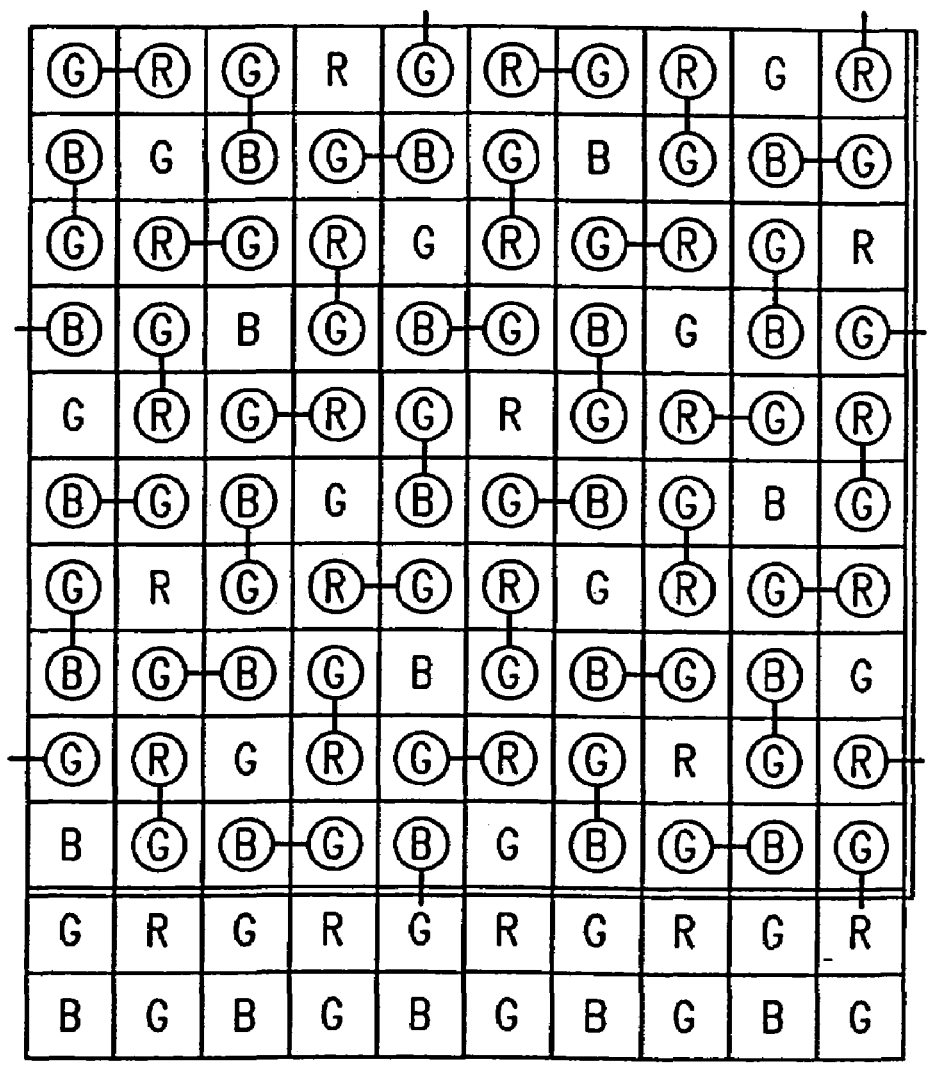
FIG. 19 is a diagram illustrating read pixel positions according to the present invention in the case where pixel data is read in a ⅘-decimated manner.

However, the present invention is not limited to such a case described in Examples 1 and 2. The present invention may include the case where the decimation rate is lower than, for example, ½ (i.e., a utilization ratio of pixels is equal to or more than ½). Specifically, read pixel positions can be selected such that in two directions crossing each other, a first pixel pair of horizontally-adjacent pixels (a first pixel unit selecting horizontally-adjacent pixels) corresponding to a first color filter segment (G) and one of a second color filter segment (R) and a third color filter segment (B) alternates with a second pixel pair of vertically-adjacent pixels (a second pixel unit selecting two vertically-adjacent pixels) corresponding to a first color filter segment (G) and the other one of a second color filter segment (R) and a third color filter segment (B), and there are (N−1) pairs (units) of unselected pixels (N is a positive integer) between the alternate first and second pairs. As specific examples of such a case, FIG. 18 illustrates the case where pixel data is read in a 24/36-, i.e., ⅔-, decimated manner, and FIG. 19 illustrates the case where pixel data is read in a 80/100-, i.e., ⅘-, decimated manner. In FIGS. 18 and 19, the mark "—" inserted between the R, G, and B pixels represents that two pixels horizontally or vertically connected by the mark make a pair of pixels as described above.

Figure 20:
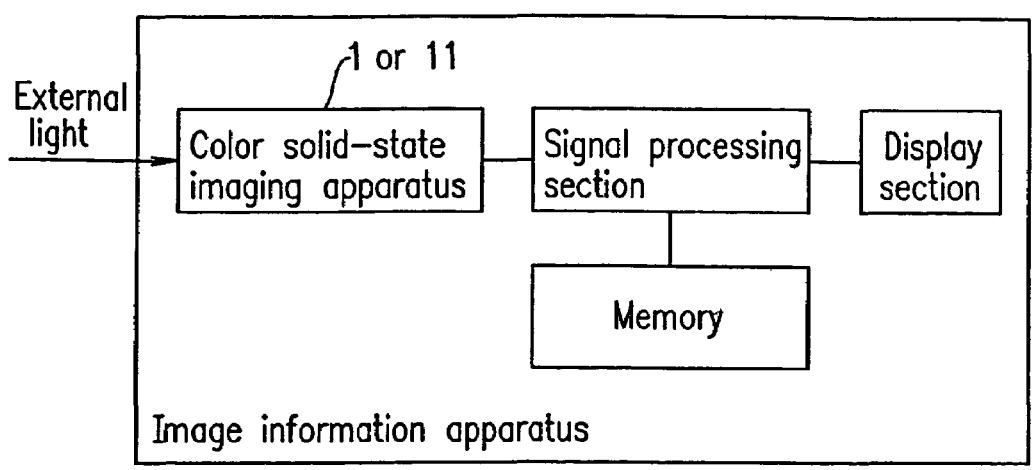
FIG. 20 is a block diagram illustrating a schematic structure of an image information apparatus including a color solid-state imaging apparatus according to the present invention.

Although not described in Examples 1 and 2, as illustrated in FIG. 20, a color solid-state imaging apparatus according to the present invention can be readily applied to an image information apparatus, such as a digital still camera, a digital video camera, a PC camera, and a mobile phone camera (i.e., a mobile phone including a built-in camera). Such an image information apparatus including the color solid-state imaging apparatus can image an object, which is projected as external light thereon, using the color solid-state imaging apparatus. A signal processing section of the image information apparatus performs signal processing on pixel data produced from the object, so that image data of the object can be produced and an image of the object is displayed on a display section of the image information apparatus. In this case, equivalent effects to those of the present invention can be obtained. That is, well-balanced horizontal and vertical resolution of an image obtained from one field can be efficiently obtained when pixel data produced from Bayer array color filter is decimatingly read.

As described above, according to the present invention, even when pixel signals corresponding to first through third color filter segments included in a Bayer array color filter are obtained by decimating pixel data, in comparison with conventional methods for reading pixel data obtained from the Bayer array color filter, a pixel signal corresponding to a first color filter segment, which is obtained from an image in one field, can have relatively high resolution which is well-balanced in both the horizontal and vertical directions. Moreover, pixel signals corresponding to a second color filter segment and a third color filter segment can have equal resolution in both the vertical and horizontal directions, so that well-balanced color signal resolution can be obtained. Thus, the most efficient resolution can be obtained for luminance and color signals.

According to the present invention, in the case where the decimation rate is ½, in comparison with the case where data corresponding to all of the pixels in the Bayer array is read, when the frame rate is the same, a period of time required for reading data corresponding to one pixel can be doubled. Alternatively, when the period of time required for reading the data corresponding to one pixel is the same, the frame rate can be doubled. Similarly, in the case where there are (N−1) pairs (units) of unselected pixels (N is a positive integer) in a pixel array, in comparison with the case where the data corresponding to all of the pixels in the Bayer array are read, when the frame rate according to the present invention is the same, a period of time required for reading data corresponding to one pixel can be lengthened depending on the decimation rate. Alternatively, when the period of time required for reading the data corresponding to one pixel according to the present invention is the same, the frame rate can be increased depending on the decimation rate.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A color solid-state imaging apparatus in which a green color (G), a red color (R) and a blue color (B) in a Bayer array are respectively provided in a pixel unit on a plurality of pixel devices provided in an imaging area;

wherein the color solid-state imaging apparatus is configured to perform at least one of a reading operation in a ½-decimated manner for ½ of the pixels of the imaging area, a reading operation in a ¼-decimated manner for ¼ of the pixels of the imaging area, a reading operation in a ⅛-decimated manner for ⅛ of the pixels of the imaging area, a reading operation in a 1/16-decimated manner for 1/16 of the pixels of the imaging area and a reading operation in a 1/18-decimated manner for 1/18 of the pixels of the imaging area so that a G signal has a first spatial resolution with a shape of a first square and each of an R signal and an B signal has a second resolution with a shape of a second square lying within and touching four sides of the first square.

2. A color solid-state imaging apparatus according to claim 1, wherein:

the reading operation in the ½-decimated manner is performed so that the first spatial resolution is up to ½ of the Nyquist threshold value in both horizontal and vertical directions and up to ½ of the Nyquist threshold value in both diagonal directions, and the second spatial resolution is up to ½ of the Nyquist threshold value in both horizontal and vertical directions and up to ¼ of the Nyquist threshold value in both diagonal directions, the reading operation in the ¼-decimated manner is performed so that the first spatial resolution is up to ½ of the Nyquist threshold value in both horizontal and vertical directions and up to ¼ of the Nyquist threshold value in both diagonal directions, and the second spatial resolution is up to ¼ of the Nyquist threshold value in both horizontal and vertical directions and up to ¼ of the Nyquist threshold value in both diagonal directions, the reading operation in the ⅛-decimated manner is performed so that the first spatial resolution is up to ¼ of the Nyquist threshold value in both horizontal and vertical directions and up to ¼ of the Nyquist threshold value in both diagonal directions, and the second spatial resolution is up to ¼ of the Nyquist threshold value in both horizontal and vertical directions and up to ⅛ of the Nyquist threshold value in both diagonal directions, the reading operation in the 1/16-decimated manner is performed so that the first spatial resolution is up to ¼ of the Nyquist threshold value in both horizontal and vertical directions and up to ⅛ of the Nyquist threshold value in both diagonal directions, and the second spatial resolution is up to ⅛ of the Nyquist threshold value in both horizontal and vertical directions and up to ⅛ of the Nyquist threshold value in both diagonal directions, the reading operation in the 1/18-decimated manner is performed so that the first spatial resolution is up to ⅙ of the Nyquist threshold value in both horizontal and vertical directions and up to ⅙ of the Nyquist threshold value in both diagonal directions, and the second spatial resolution is up to ⅙ of the Nyquist threshold value in both horizontal and vertical directions and up to 1/12 of the Nyquist threshold value in both diagonal directions.

\* \* \* \* \*